Nov. 20, 1928.

R. A. BOTTS 1,692,153

HEAT CONTROL FOR COOKING UTENSILS

Filed March 16, 1928

INVENTOR
R. A. Botts
BY
ATTORNEY

Patented Nov. 20, 1928.

1,692,153

UNITED STATES PATENT OFFICE.

RAYMOND A. BOTTS, OF STOCKTON, CALIFORNIA.

HEAT CONTROL FOR COOKING UTENSILS.

Application filed March 16, 1928. Serial No. 262,213.

This invention relates to a means for automatic control of the heat applied to the bottoms of utensils in which foods or other products are being cooked. The majority of cooking pots or other utensils used at the present time are made of aluminum; whose bottoms naturally expand or flex to a marked extent when they attain a certain heat.

The temperature necessary to cause such flexing to take place is attained when any standing water, etc., is evaporated from the utensil but before the solid matter in the utensil has a chance to stick or burn.

The principal object of my invention is to provide a thermostatic heat or fire control apparatus which utilizes this expanding or flexing bottom of the utensil as the thermostat itself. There is therefore nothing for the cook or other operator to set and the heat will be automatically shut off as soon as the utensil expands with the drying up of the water therein. With this arrangement, therefore, there is no danger of foods or other products being burnt if the cook inadvertently forgets to watch the same, since sufficient expansion of the bottom of the vessel takes place to shut off the heat as soon as the vessel is clear of standing liquid but before the moisture is dried out from the product sufficiently to cause the same to stick or burn. In fact, the cook may intentionally leave the food, etc., on the fire to be cooked, adjusting the heat of the fire so that the cooking will be completed by the time the water is evaporated, since the shutting off of the heat at such time will then positively take place.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
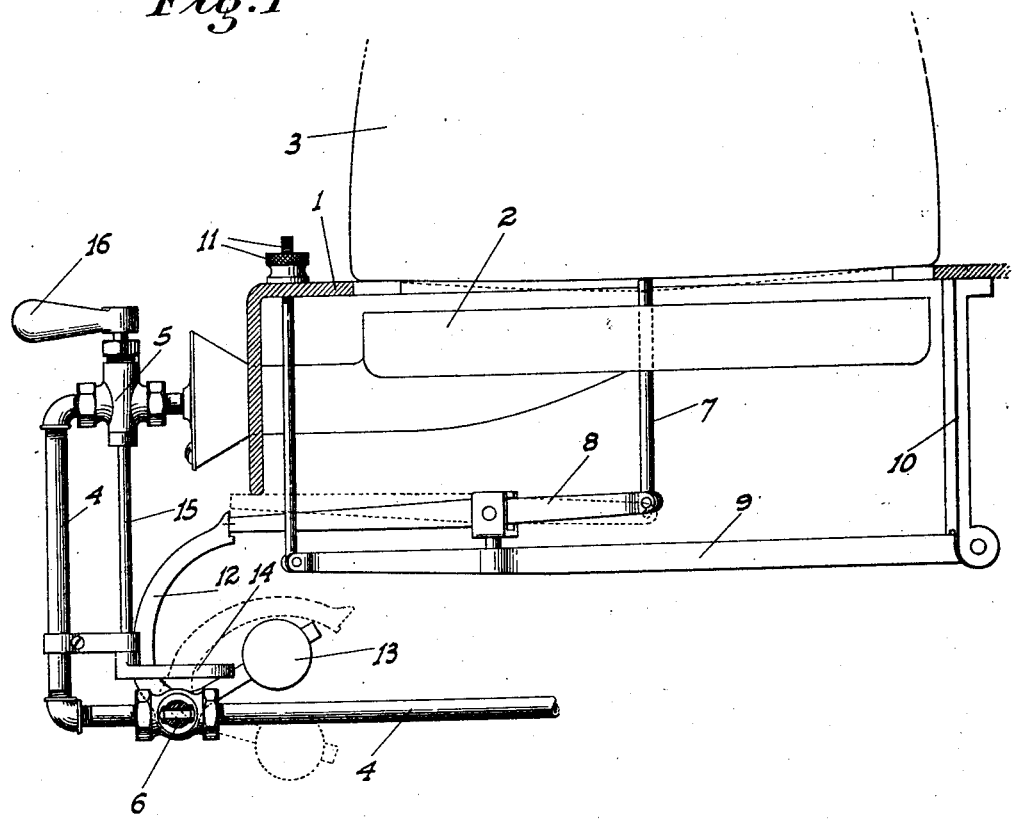
Fig. 1 is a side elevation of my improved control device shown in connection with a gas stove and the control valve of the burner; the control pin being in its normal uppermost position.
Figure 2:
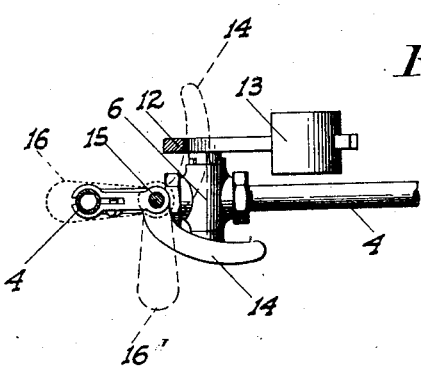
Fig. 2 is a fragmentary plan view showing a means for reopening the auxiliary valve by means of the closing of the main control valve.

Referring now more particularly to the characters of reference on the drawings, the numeral 1 denotes the orificed top plate of an ordinary gas stove under which is mounted the burner 2; the aluminum cooking utensil 3 of ordinary character, and having a normally flat bottom, resting on the plate over the burner when cooking is in progress.

Leading to the burner 2 is a gas feed pipe 4 having a main control valve 5 of usual form interposed therein adjacent the burner and another valve 6 beyond the valve 5. The valve 5 is set with a vertical axis and moves through a 90° arc, while the valve 6 is set with a horizontal axis and preferably moves through a lesser arc (about 45°) between open and closed positions.

Projecting upwardly through the burner to engage the bottom of the utensil 3 at the center thereof is a vertical pin 7 which is fastened at its lower end to one end of a horizontal lever 8. This lever is pivoted intermediate its ends onto a horizontal supporting bar 9. One end of this bar is secured to a bracket 10 and the other end to a vertically adjustable screw 11 which projects upwardly through the plate 1 in front of the burner. The free end of the lever 8 normally abuts, when the pin is raised, against the upper end of an arm 12 secured to the turnable member of the valve 6, said valve being then in its open position. The arm and lever are maintained in frictional engagement with each other by a weight 13 or the like applied to the valve or to its arm; the weight also tending to turn the valve to a closed position.

The arm is positioned so that when the valve is opened the closing movement of said arm (which takes place in a direction away from the front of the stove and toward the lever 8) will not cause the upper end of said arm to be raised. The arm 12 is adapted to be engaged when the valve is closed, by a cam member 14 which is secured to and projects laterally from a stem 15 depending from the valve 5 and connected to the turnable member thereof. This cam member is so arranged relative to the arm and to the position of the handle 16 of the valve 5 that when the arm 12 has moved to the position occupied when the valve 6 is closed, the arm will be engaged and moved in the opposite direction by the cam only after the handle 16 has turned a considerable distance toward a valve closing position. The valve 6 is restored to a fully open position by the time the valve 5 is fully closed. As the valve is thus opened, the upper end of its arm 12 moves clear of the adjacent end of the lever 8 allowing the latter to drop into abutting relationship therewith when the utensil is removed or when its bottom is in its normal unflexed position. The relationship of the resetting cam to the valves as above stated enables the control valve 5 to be set to different positions, to control the heat of the fire to suit without affecting the valve 6 and without preventing its moving to a fully closed position when released from the lever 8.

The adjustable screw 11 enables the height of the pivot of the lever 8 to be raised or lowered so as to cause the free end of the lever to be likewise moved. This enables the lever and arm 12 to engage each other in the same relationship regardless of any differences of initial setting of the lever which might be had by reason of differences in normal curvature of the bottoms of the utensils which engage the pin.

In this manner the same amount of heat and subsequent flexing of the bottom, regardless of its initial setting, is necessary to cause the lever to trip and release the arm 12. This adjustment also enables the setting of the lever relative to the arm to be altered so as to cause the lever to trip with a greater or lesser amount of heat and a corresponding difference in flexing in the bottom of the utensil as may be desired.

In operation the utensil is initially treated if necessary so that its bottom will have a slightly inherent downward curvature or dish when cool so that when heated the bottom will tend to continue to curve or flex downwardly. The bottom contacts with the pin 7 which is then in its uppermost position with the lever 8 engaging the arm 12. If the normal curvature of the bottom is such as to depress the pin somewhat and raise the free end of the lever, said free end may be readily reset to its proper level and relationship to the arm by lowering the lever supporting bar 9 by means of the screw 11. When the bottom subsequently flexes down as the liquid in the utensil is evaporated, the pin is gradually depressed until the lever clears the arm 12. The weight 13 then functions to pull the arm and valve to a valve closing position shutting off the fire regardless of the setting of the valve 5. When the latter is subsequently closed such closing will again open the valve 6 and reset the arm 12 as previously explained.

While I have shown and described this structure as being used in connection with a gas stove, for which it is particularly adapted, it will be evident that the valve 6 may be replaced by a switch in the circuit of an electric stove, or an equivalent of the member 12 may be used to operate a damper in a coal or wood stove. In either case the result is the same, namely the shutting off of the heat under the overheated utensil.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A heat control device for a stove comprising, with a utensil having a bottom adapted to flex vertically when a certain degree of heat is attained, and a heating device over which the utensil is adapted to be positioned, a vertically movable member to engage the bottom of the utensil, means causing the member to move with the bottom of the utensil as said bottom flexes, and means governed by such vertical movement of the member for causing the operation of the heating device to be discontinued.

2. A heat control device for a stove comprising, with a utensil having a bottom adapted to flex vertically when a certain degree of heat is attained, and a heating device over which the utensil is adapted to be positioned, means for controlling the operation of the heating device, and means between said first named means and the bottom of the utensil for causing the operation of the heating device to be discontinued when said bottom has flexed to a predetemined extent.

3. A heat control device for a stove comprising, with a utensil having a bottom adapted to flex vertically when a certain degree of heat is attained, and a heating device over which the utensil is adapted to be positioned, a valve for controlling the operation of the heating device, and means between said valve and the bottom of the utensil for causing the valve to close when said bottom has flexed to a predetermined extent.

4. A heat control device for a stove comprising, with a utensil having a bottom adapted to flex vertically when a certain degree of heat is attained, and a heating device over which the utensil is adapted to be positioned, a valve for controlling the operation of the heating device, releasable means normally holding the valve open, means acting to close the valve when said first named means is released, and means actuated by a flexing of the bottom of the utensil to a predetermined extent for releasing said first named means.

5. A heat control device for a stove comprising, with a utensil having a bottom adapted to flex vertically when a certain degree of heat is attained, and a heating device over which the utensil is adapted to be positioned, a valve for controlling the operation of the heating device, means tending to close the valve, an arm projecting from the valve, a pivoted lever one end of which normally engages the free end of the arm to prevent the valve closing means from functioning, and means causing the lever to be tilted to disengage the same from the arm when the bottom of the utensil flexes a predetermined amount.

6. A heat control device for a stove comprising, with a utensil having a bottom adapted to flex vertically when a certain degree of heat is attained, and a heating device over which the utensil is adapted to be positioned, a valve for controlling the operation of the heating device, means tending to close the valve, an arm projecting from the valve, a pivoted lever one end of which normally engages the free end of the arm to prevent the valve closing means for functioning, and a vertical pin connected to the lever and engaging the bottom of the utensil.

7. A heat control device for a stove comprising, with a utensil having a bottom adapted to flex vertically when a certain degree of heat is attained, and a heating device over which the utensil is adapted to be positioned, a valve for controlling the operation of the heating device, means tending to close the valve, an arm projecting from the valve, releasable means normally engaging said arm to hold the valve open, and means causing said first named means to be released from the arm when the bottom of the utensil flexes a predetermined amount.

8. A structure as in claim 7, with means for enabling the amount of such flexing necessary to cause the arm to be released to be altered at will.

9. A heat control device for a stove comprising, with a utensil having a bottom adapted to flex vertically when a certain degree of heat is attained, and a heating device over which the utensil is adapted to be positioned, a turnable valve for controlling the operation of the heating device, an arm projecting radially from the valve, a horizontal lever pivoted intermediate its ends, one end of said lever normally engaging the arm to hold the same in a valve-opening position, means tending to close the valve, and a vertical pin connected to the other end of the lever and engaging the bottom of the utensil when the latter is positioned over the heating device, said bottom being adapted to flex downwardly under the influence of heat.

10. A structure as in claim 9, with a vertically adjustable support for the lever.

11. A heat control device for a gas stove comprising, with a utensil having a bottom adapted to flex vertically when a certain degree of heat is attained, and to be positioned over a burner of the stove, a gas pipe leading to the burner, a pair of separated valves interposed in the pipe, means tending to close one valve, means normally holding said valve open independent of the other valve, means actuated by a flexing of the bottom of the utensil a predetermined amount for enabling the valve closing means to function, and means actuated upon the closing of the other valve for again opening said one valve.

12. A heat control device for a gas stove comprising, with a utensil having a bottom adapted to flex vertically when a certain degree of heat is attained, and to be positioned over a burner of the stove, a gas pipe leading to the burner, a pair of separated valves interposed in the pipe, closing means for one valve functioning upon the flexing of the bottom of the utensil a predetermined amount, and means controlled by the closing of the other valve for moving said one valve to an open position.

13. A structure as in claim 12, in which said last named means is arranged to permit a certain degree of closing movement of the other valve, from a fully open position, without affecting said one valve.

In testimony whereof I affix my signature.

RAYMOND A. BOTTS.